United States Patent [19]

Terabayashi

[11] 4,410,061

[45] * Oct. 18, 1983

[54] PASSIVE SEATBELT SYSTEM

[75] Inventor: Gosaku Terabayashi, Aichi, Japan

[73] Assignee: Toyota Jidosha Kogyo Kabushiki Kaisha, Toyota, Japan

[*] Notice: The portion of the term of this patent subsequent to Aug. 17, 1999 has been disclaimed.

[21] Appl. No.: 242,373

[22] Filed: Mar. 10, 1981

Related U.S. Application Data

[63] Continuation-in-part of Ser. No. 90,915, Nov. 5, 1979, abandoned.

[30] Foreign Application Priority Data

Nov. 6, 1978 [JP] Japan ................................ 53-136549

[51] Int. Cl.³ ............................................. B60R 21/10
[52] U.S. Cl. ..................................... 180/268; 180/270; 280/802; 307/105 B
[58] Field of Search ..................... 180/268, 269, 270; 280/802, 803, 804; 297/468, 469, 473, 474, 475, 479; 307/105 B

[56] References Cited

U.S. PATENT DOCUMENTS

| | | | |
|---|---|---|---|
| 3,882,955 | 5/1975 | Kaneko | 180/270 |
| 3,935,470 | 1/1976 | Cake | 180/270 |
| 4,061,365 | 12/1977 | Nagano | 180/270 |
| 4,096,468 | 6/1978 | Kopera | 180/270 |
| 4,321,979 | 3/1982 | Kuroyama | 180/268 |
| 4,344,502 | 8/1982 | Terabayashi | 180/268 |

Primary Examiner—Joseph F. Peters, Jr.
Assistant Examiner—John A. Carroll
Attorney, Agent, or Firm—Cushman, Darby & Cushman

[57] ABSTRACT

In a passive seatbelt system, an occupant restraining webbing can be automatically fastened to or unfastened from an occupant in accordance with the condition of the occupant getting into or out of an automotive vehicle. When required, a webbing driving means is driven for a predetermined period of time for fastening or unfastening the webbing. Furthermore, when the webbing has moved to a webbing fastened position or unfastened position within the predetermined period of time, an electric power fed to the webbing driving means is cut off, whereby the webbing driving means can be reliably protected even if an overload acts on the webbing driving means.

5 Claims, 4 Drawing Figures

FIG. 1
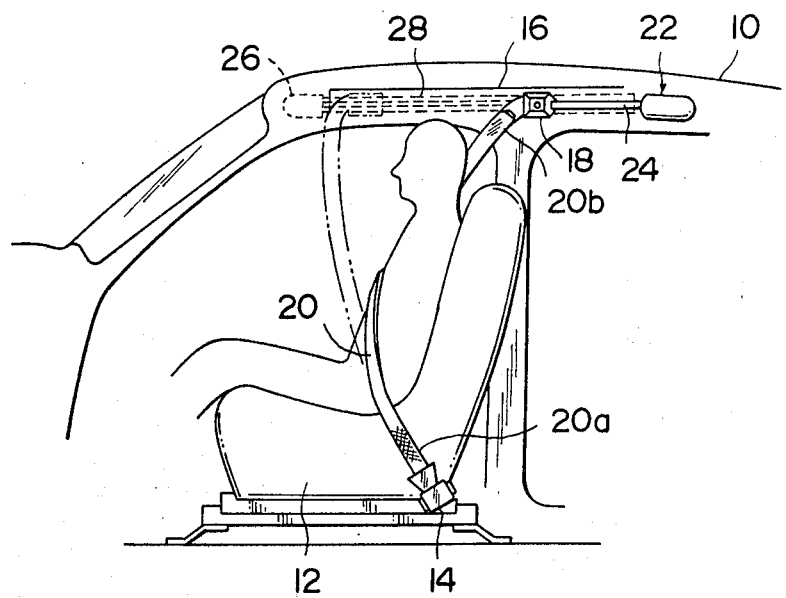
FIG. 3
FIG. 4
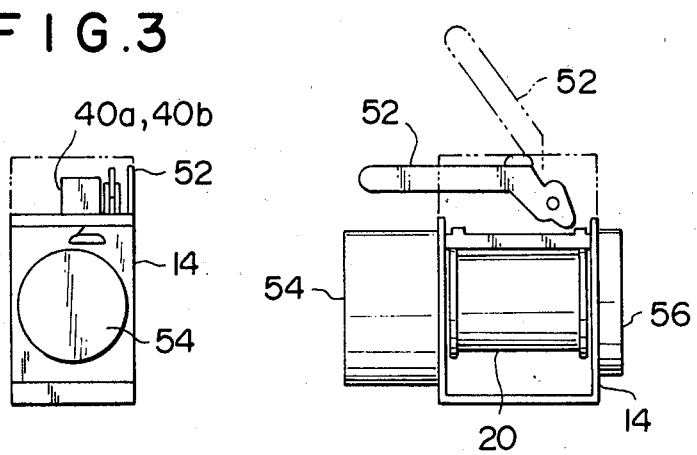

PASSIVE SEATBELT SYSTEM

This is a continuation-in-part of the application Ser. No. 90,915 filed Nov. 5, 1979 now abandoned.

BACKGROUND OF THE INVENTION

1. Field of the Invention

The present invention relates to a seatbelt system for restraining and protecting an occupant in a vehicular emergency, and more particularly to improvements in a full-passive type seatbelt system wherein means for driving the webbing is automatically actuated in accordance with the actions of the occupant getting into or out of the vehicle so as to fasten the webbing to the occupant or release the webbing from the occupant.

2. Description of the Prior Art

To secure the safety of the occupant in an accidental collision which would occur to the vehicle, there have heretofore been used seatbelt systems. To further improve the safety of the occupant, there have been proposed the so-called full-passive type seatbelt systems capable of automatically fastening the webbing for restraining or releasing the occupant in accordance with the actions of the occupant getting into or out of the vehicle.

In said full-passive type seatbelt system, the webbing for restraining the occupant is secured at one end thereof to the side surface of a seat for the occupant on the side opposite the door for getting into or out of the vehicle and at the other end thereof to the door, and the portion of the webbing mounted on the door is moved in the longitudinal direction of the vehicle by driving means such as a motor, whereby the space existing between the webbing and the seat for the occupant is expanded or contracted, so that space for the occupant to get into or out of the vehicle is provided when the occupant gets into or out of the vehicle, and the webbing can be reliably fastened to the occupant after the occupant has gotten into the vehicle. Additionally, a switch for detecting the conditions of the door being open and closed is provided in an electric circuit of said motor, whereby, in the case of the door being closed, the webbing is moved toward the rear of the vehicle, i.e. in the direction of the seat to fasten the occupant thereto with the webbing, and, in the case of the door being open, the webbing is moved toward the front of the vehicle to form a space sufficient for the occupant to get into and out of the vehicle between the webbing and the seat.

FIG. 1 shows one example of the full-passive type seatbelt system which has been proposed heretofore. In the drawing, designated at 10 is a vehicle body, 12 a seat for an occupant being disposed on the floor of said vehicle body 10, 14 a webbing retractor solidly secured to the side surface of said seat 12 to one side of the center of the vehicle, 16 a guide rail attachingly provided on the roof side member of the vehicle body 10, 18 a slide plate slidable along said guide rail 16 in the longitudinal direction of the vehicle, 20 a seatbelt of webbing, the inner end 20a of which is wound up into said retractor 14 by its biasing force and the outer end 20b of which is engaged with said slide plate 18, 22 a retractor solidly secured to the roof side member of the vehicle for constantly biasing said slide plate 18 toward the rear of the vehicle through a narrow width webbing 24, and 26 driving means for moving said slide plate 18 in the longitudinal direction of the vehicle by winding up one end of a wire 28, the other end of which is fixed on said slide plate 18. Here, the driving means 26 is adapted to be operated on detecting the action of the occupant getting out of the vehicle. For instance, if the occupant opens the door for getting into or out of the vehicle, this driving means is operated by an opened door detecting signal emitted then. Furthermore, the driving means 26 is adapted to deliver the wire 28 by the action of the occupant in being seated, e.g. by closing the door after he or she is seated. With the above-described full-passive type seatbelt system, in the case of the door being closed, the webbing is moved toward the rear of the vehicle, i.e. in the direction of the occupant's seat, whereby the webbing is fastened to the occupant, and, in the case of the door being open, the webbing is moved toward the front of the vehicle, whereby a space sufficient for the occupant to get into and out of the vehicle is formed between the webbing and the seat for the occupant.

In the above-described conventional full-passive type seatbelt system, the motor or driving means to move the webbing for restraining or releasing the occupant should desirably operate for a period of time necessary for restraining or releasing the occupant by moving the webbing. In connection thereto, the conventional full-passive type seatbelt system has a disadvantage in that the excess operation of the motor beyond the necessary period of time causes the motor to be in trouble by being locked from rotating. The same problem to the motor occurs when the webbing stops moving for some reason during the necessary period of time.

SUMMARY OF THE INVENTION

One object of the present invention is to obviate the above-described disadvantages of the prior art and provide a passive seatbelt system wherein the driving means for the webbing can be controlled to operate only for a necessary period of time for restraining or releasing the occupant by the webbing, so that the driving means can be protected from the above-mentioned trouble.

According to the present invention, a passive seatbelt system wherein means for driving the webbing is automatically actuated in accordance with the actions of the occupant getting into or out of the vehicle to fasten the webbing to the occupant and release the webbing from the occupant, includes a control circuit for controlling the means for driving the webbing. The control circuit provides an output for a predetermined period of time and activates the means for driving the webbing for a necessary period of time for restraining or releasing the occupant. The control circuit also controls the output, namely stops providing the output when the webbing reaches points where the occupant is restrained or released even during a predetermined period of time, thereby stops activating the means for driving the webbing.

BRIEF DESCRIPTION OF THE DRAWINGS

The above-mentioned features and objects of the present invention will become more apparent by reference to the following description taken in conjunction with the accompanying drawings, wherein like reference numerals denote like elements, and in which:

FIG. 1 is a side view showing the vehicle occupant's seat provided thereon with the full-passive type seatbelt system;

FIGS. 3 and 4 are a front and a side view showing the condition of providing the spool release switch used in said embodiment.

DETAILED DESCRIPTION OF THE INVENTION

Figure 2:
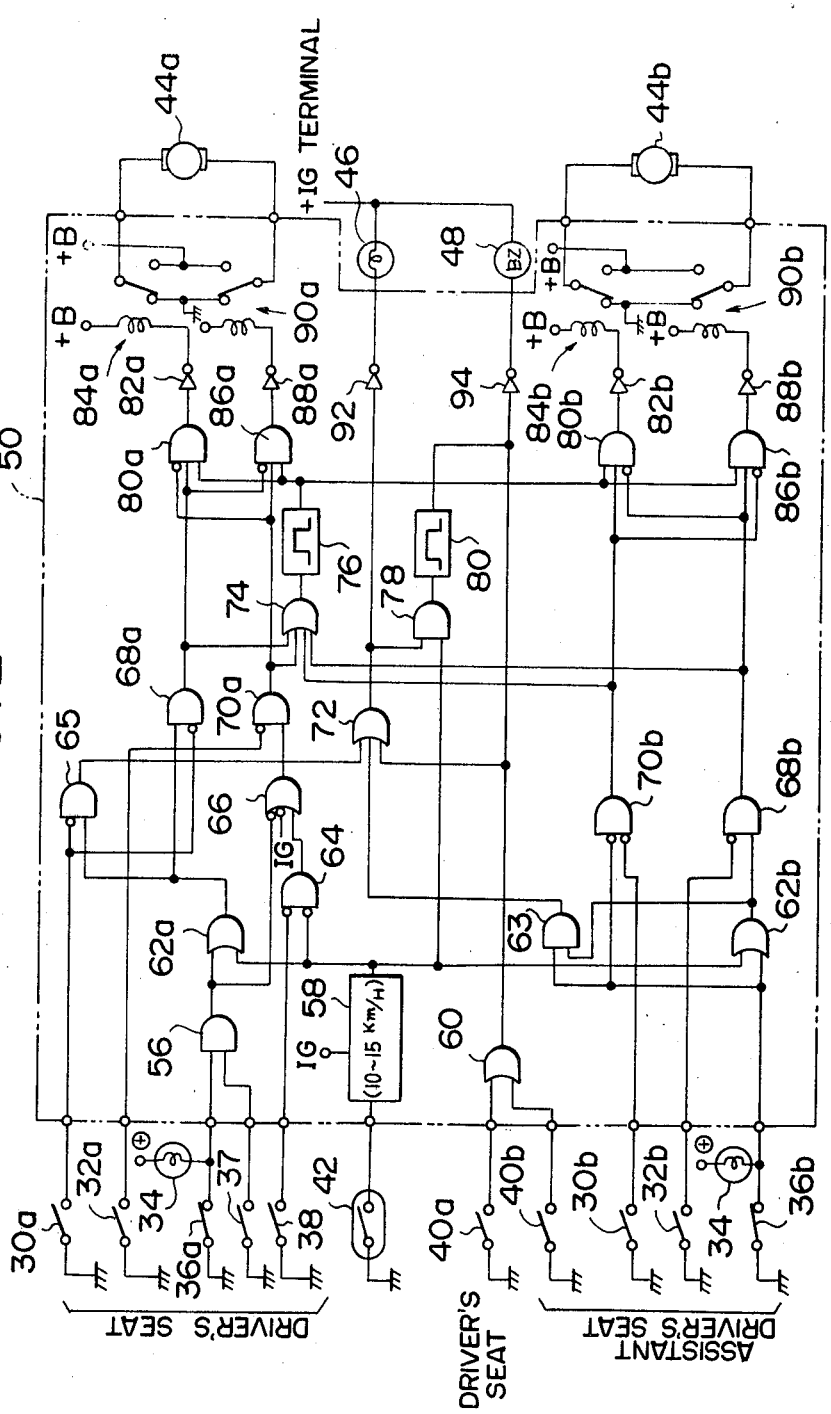
FIG. 2 is a circuit diagram showing the arrangement of one embodiment of the passive seatbelt system according to the present invention.

Detailed description will hereunder be given of one embodiment of the present invention with reference to the drawings. As shown in FIG. 2, this embodiment comprises:

a limit switch 30a for detecting the movement of the webbing on the side of the operator's seat to the fastened position and operating; a limit switch 32a for detecting the movement of the webbing on the driver's side to the released condition and operating; a door switch 36a for turning on or off a passenger compartment lamp 34 in relation with the condition of the door on the side of driver's seat being opened or closed; a seat switch 37 provided at the driver's seat for detecting the condition of the driver being seated and operating; a cancel switch 38 to be manually operated by the driver for temporarily releasing the webbing when the vehicle is in a garage or the like; a spool release switch 40a provided on the retractor for the webbing on the side of driver's seat for operating when the webbing, restrained by the winding spool, is manually released; a limit switch 32b for detecting the condition of the webbing on the side of the front seat passenger's seat being in the fastened position and operating; a limit switch 30b for detecting the condition of the webbing on the side of the front seat passenger's seat being in the released position and operating; a door switch 36b operationally associated with the condition of the door on the side of the front seat passenger's seat being opened or closed for turning on or off the passenger compartment lamp 34; a spool release switch 40b provided on the retractor for the webbing on the side of the front seat passenger's seat for operating when the webbing, restrained by the winding spool, is manually released; a vehicle speed sensor 42 utilizing an input or output of a speedometer (not shown) indicating the vehicle speed to thereby send out an electric signal in accordance with the running speed of the vehicle; a motor 44a reversely rotatable for driving the webbing on the side of driver's seat; a motor 44b also reversely rotatable for driving the webbing on the side of the front seat passenger's seat; a warning lamp 46 and a warning buzzer 48, the respective ends of which are connected to IG terminals, to each of which the power is supplied when the ignition switch (not shown) for turning on and off the power to be fed to an ignition circuit of the engine (not shown) is turned on; and a control circuit 50 for controlling the motors 44a, 44b, warning lamp 46 and warning buzzer 48 in response to output signals from the respective detecting ends.

Both of the aforesaid limit switches 30a and 32b are provided adjacent the rear end of the guide rail 16 shown in FIG. 1, for example, and adapted to send out a predetermined voltage signal from the circuit (not shown), i.e., a signal of level "H" to the control circuit 50 when the slide plate 18 reaches a position adjacent the rear end of the guide rail 16, i.e., the webbing 20 is pulled securely against the occupant.

Furthermore, both of the aforesaid limit switches 32a and 30b are provided adjacent the forward end of the guide rail 16 shown in FIG. 1, for example, and adapted to send out a predetermined voltage signal, i.e., a signal of level "H" to the control circuit 50 when the slide plate 18 reaches a position adjacent the forward end of the guide rail 16, i.e., the webbing 20 is released from the occupant.

Both of the aforesaid door switches 36a and 36b are provided on the doors on the driver's seat side and on the front seat passenger's seat side, respectively, and adapted to connect one end of the passenger compartment lamp 34, the other end of which is connected to a power source, to ground to thereby to turn on the lamp 34 and send out a signal of level "L" to the control circuit 50 when the door is open. The switches 36a and 36b are adapted to disconnect a non-power terminal of the lamp 34 from ground and send out a signal of level "H" to the control circuit 50 through the lamp 34 when the door is open.

The aforesaid cancel switch 38 is adapted to be operated by the driver to send out a ground signal, i.e., a signal of level "L" to the control circuit 50 in the case he or she wants to temporarily release the webbing, such as to facilitate the act of parking the vehicle in a garage.

The spool release switches 40a and 40b, as shown in FIGS. 3 and 4, are provided on the retractor 14 secured to the side surface of the seat for the occupant at the center of the vehicle, and are adapted to send out a predetermined signal, i.e., a signal of level "H" to the control circuit 50 when the webbing 20 is released by a release lever 52. In FIGS. 3 and 4, designated at 54 is an inertia-locking sensor for locking the retractor in a vehicular emergency, and 56 is spiral spring for winding up the webbing 20 in normal conditions.

As shown in FIG. 2, the control circuit 50 comprises: an "AND" circuit 56 for sending out a logical product between an output from the door switch 36a and an output from the seat switch 37; a vehicle speed detecting circuit 58 for sending out a signal of level "H" when the vehicle speed exceeds 10~15 km/h and for sending out a signal of the level "L" when the vehicle speed is less than 10~15 km/h, in response to an output from said vehicle speed sensor 42; an "OR" circuit 60 for sending out a logical sum between outputs from the spool release switches 40a and 40b; and "OR" circuit 62a for sending out a logical sum between an output from the vehicle speed detecting circuit 58 and an output from the "AND" circuit 56; an "AND" circuit 64 for sending out a logical product between the "not" of an output from the cancel switch 38 and the "not" of an output from the vehicle speed detecting circuit 58; an "OR" circuit 66 for sending out a logical sum between an output from the "AND" circuit 64, the "not" of an output from the "AND" circuit 56 and the "not" of a voltage signal applied to the ignition circuit of the engine; an "AND" circuit 65 for sending out a logical product between the "not" of an output from the limit switch 30a and an output from the "OR" circuit 62a; an "AND" circuit 68a for sending out a logical product between the "not" of an output from the limit switch 30a and an output from the "OR" circuit 62a; an "AND" circuit 70a for sending out a logical product between the "not" of an output from the limit switch 32a and an output from the "OR" circuit 66; an "OR" circuit 62b for sending out a logical sum between an output from the vehicle speed detecting circuit 58 and an output from the door switch 36b; an "AND" circuit 63 for sending out a logical product between an output from the door switch 36b and an output from the "OR" circuit 62b; an "AND" circuit 68b for sending out a logical product between an output from the "OR" circuit 62b and the "not" of an output from the limit switch 32b; an "AND" circuit 70b for sending out a logical product between the "not" of an output of the limit switch 30b and the "not" of an output from the door switch 36b; and "OR" circuit 72 for sending out a logical sum between an output from the "AND" circuit 65, an output from the "AND" circuit 63 and an output from the "OR" circuit 60; an "OR" circuit 74 for sending out a logical sum of outputs from the "AND" circuit 68a, "AND" circuit 70a, "AND" circuit 68b and "AND" circuit 70b; a timer 76 for sending out a signal of level "H" in response to an output from the "OR" circuit 74 for 15 sec.; an "AND" circuit 78 for sending out a logical product between an output from the "OR" circuit 72 and an output from the vehicle speed detecting circuit 58; a timer 80 for sending out a signal of level "H" in response to an output from the "AND" circuit 78 for a predetermined period of time, such for example as 4 to 8 sec.; an "AND" circuit 80a for sending out a logical product of the "not" of an output of the "AND" circuit 70a, an output from the "AND" circuit 68a and an output from the timer 76; an inverter 82a for inverting an output from the "AND" circuit 80a; a relay 84a being actuated in response to an output from the inverter 82a for rotatingly driving the motor 44a in the direction of securing the webbing against the occupant; an "AND" circuit 86a for sending out a logical product of the "not" of an output from the "AND" circuit 68a, an output from the "AND" output 70a and an output from the timer 76; an inverter 88a for inverting an output from the "AND" circuit 86a; a relay 90a being actuated in response to an output from the inverter 88a for rotatingly driving the motor 44a in the direction of releasing the occupant from the webbing; an "AND" circuit 80b for sending out a logical product of an output from the timer 76, an output from the "AND" circuit 70b and the "not" of an output from the "AND" circuit 68b; an inverter 82b for inverting an output from the "AND" circuit 80b; a relay 84b being actuated in response to an output from the inverter 82b for rotatingly driving the motor 44b in the direction of releasing the occupant from the webbing; an "AND" circuit 86b for sending out a logical product of an output from the timer 76, an output from the "AND" circuit 68b and the "not" of an output from the "AND" circuit 70b; an inverter 88b for inverting an output from the "AND" circuit 86b; a relay 90b being actuated in response to an output from the inverter 88b for rotatingly driving the motor 44b in the direction of securing the webbing against the occupant; an inverter 92 for inverting an output from the "OR" circuit 72 and feeding same to the warning lamp 46 as a light warning signal; and an inverter 94 for inverting an output from the timer 80 and an output from the "OR" circuit 60 and feeding same to the warning buzzer 48 as an aural warning signal.

The above-described apparatus works as follows. When the occupants of the vehicle, driver or other non-driver occupants get into the vehicle and close the respective door, then the door switch 36a or 36b is opened, and a signal of level "H" is fed to the control circuit 50. Thereupon, the signal of level "H" passes through the "AND" circuit 56, the "OR" circuit 62a or 62b, the "AND" circuit 68a or 68b, the "AND" circuit 80a or 86b and the inverter 82a or 88b and is transmitted to the relay 84a or 90b. Then, the relay 84a or 90b is excited, whereby the motor 44a or 44b is energized in the direction that causes automatic fastening of the webbing to the respective occupant. Whenever an occupant gets into the vehicle, the webbing is invariably fastened to the occupant as described above. However, there may occur such a case that the occupant releases himself or herself from the condition of being restrained by the webbing from some reason such as necessity of putting the vehicle into a garage. Consequently, according to the present invention, in the case the vehicle speed reaches the medium or high speed running condition of more than 10~15 km/h, if the webbing is in the released condition, the motor is adapted to be driven to bring the webbing into the fastened condition again. More particularly, when the vehicle speed detected by the vehicle speed sensor 42 exceeds 10~15 km/h, the output from the vehicle speed detecting circuit 58 is provided at the level "H". This output is transmitted to the "OR" circuit 62a or 64b, whereby the motor 44a or 44b is driven in the direction of tightening the webbing onto the occupant again similarly to the case of initially getting into the vehicle.

When the limit switch 30a or 32b detects the movement of the webbing and the fastened condition of the webbing, the input to one of either the "AND" circuit 68a or 68b is released, whereby rotation of the motor 44a or 44b is interrupted, thereby preventing the motor from rotating beyond necessity. When the regular position of fastening the webbing to the occupant is arrived at as described above, the motor is cut off the power through the agency of the limit switch 30a or 32b. However, there may occur such a case that the slide plate is mechanically interrupted by a foreign material or the like during its course of movement. If electric current is supplied in such a case as above, the motor may burn out. To avoid this danger, the timer 76 is provided. In the case the motor continuously rotates for more than 15 sec., which is preset by the timer and sufficient for the motor to move from the fastened condition to the released condition or vice versa under normal conditions, for example, the motor is forcibly cut off from the power, thus protecting the motor.

The webbing is released in the following manner. As for the driver's seat, the webbing is released in the case of the ignition switch being turned off or the door being opened, or in the case of the vehicle speed being less than 10~15 km/h and the cancel switch being turned on. Here, the cancel switch 38 is provided for the purpose of meeting the necessity of temporarily releasing the webbing in the case of putting the vehicle into the garage or the like. Even in this released condition, the motor 44a or 44b is rotated in the direction of releasing the webbing from the occupant in response to the actions of the aforesaid switches, and, when the limit switch 32a or 30b detects that the released condition is arrived at, the motor is adapted to be automatically stopped.

It may not necessarily be sufficient only to automatically tightening the webbing onto or release same from the occupant as described above. Hence, according to the present invention, in case the webbing does not move to the regular fastening position, or in case the spool release switch 40a or 40b is turned off due to the necessity at the time of escaping in an emergency and the retractor is out of order, an output from the limit switch 30a or 32b provided at the fastening position is utilized to turn on the warning lamp 46 to thereby give warning to the driver or occupant. Additionally, the warning buzzer 48 operates since the warning by the lamp is not necessarily sufficient. Namely, under the conditions of the warning lamp operating as described above, and further, if the vehicle speed reaches the medium or high speed running condition, exceeding 10~15 km/h, the warning buzzer 48 is actuated for 4 to 8 sec., to thereby further call the vehicle occupant's attention.

Furthermore, the warning buzzer 48 is adapted to constantly operate while the spool release switch 40a or 40b is in operation irrespective of the vehicle speed.

In this embodiment, the seat switch which is the seated condition sensor is provided only on the driver's seat, and, with regard to the driver's seat, the webbing is tightened against the driver when the door is opened and the driver takes the seat to turn off the seat switch. Consequently, as for the driver's seat which is frequently used, in opening the door and getting into the vehicle, the webbing is in the released condition even before the door is opened, whereby the driver can easily get on the vehicle, so that the durability of the motor and the like can be improved, and power consumption can be reduced.

Furthermore, in this embodiment, the timer 76 is provided and, even in the case the webbing does not move to the regular fastened condition or released condition, if a predetermined period of time lapses, the motor is adapted to automatically cut off the power. Consequently, even in case the motor is locked on the way, the motor does not burn out, so that the motor is protected. Namely, in general, a circuit breaker is built in the motor for protecting the motor. But the circuit breaker operates in such a manner that the circuit breaker is very susceptible to influence from the ambient temperature and tends to so extend the off time thereof that even at the normal temperature the length of the off time is $t_0 \geq 40$ sec. and at higher temperature the off time is extended to $t_0 \geq 60$ sec., thus presenting a potentially dangerous situation. On the other hand, in use of the present invention, in case the motor is interrupted in operation due to some trouble in the belt system, the motor is locked while the timer is operating. If the trouble is removed, the motor is restored to regular operation. Additionally, even if the timer is operated once, the motor is operated again when the door is opened or closed, or the vehicle speed reaches 10~15 km/h. Consequently, the circuit breaker for protecting the motor works effectively only when the timer is not operating, thus offering double protection for the motor.

Furthermore, in the preceding embodiment, the door switch for turning on or off the passenger compartment interior light is utilized for the means for detecting the open or closed door condition, an input to or an output from the speedometer for indicating the vehicle speed being utilized for the means for detecting the vehicle speed. The means for detecting the fastened condition is a limit switch for operating in accordance with the amount of movement of the webbing. The means for detecting the unrestraining webbing condition is a spool release switch for operating when the condition of the webbing restrained by the winding spool provided on the retractor of the webbing is manually released. The light warning means is a warning lamp, and the aural warning means is a warning buzzer. However, the above-mentioned various means are not limited to those as described above.

The period of time is not limited to 4 to 8 sec., during which the aural warning means operates when the light warning means operates. The medium or high speed running condition of the vehicle is detected by the means for detecting the vehicle speed.

From the foregoing description, it should be apparent to one skilled in the art that the above-described embodiment is but one of many possible specific embodiments which can represent the applications of the principles of the present invention. Numerous and varied other arrangements can be readily devised by those skilled in the art without departing from the spirit and scope of the invention.

What is claimed is:

1. A passive seatbelt system for an automotive vehicle wherein means for driving an occupant restraining webbing is automatically operated in accordance with actions of an occupant getting into and out of the vehicle to fasten the webbing to or unfasten from the occupant, characterized by comprising a drive control circuit for generating a control output for a predetermined period of time to operate said means for driving the webbing when the webbing is required to be fastened to or unfastened from the occupant, and further for ceasing the generation of the drive control output to stop the operation of said means for driving the webbing when the webbing has moved to a webbing fastened position or a webbing unfastened position even within the predetermined period of time.

2. A passive seatbelt system for an automotive vehicle including a webbing, one end of which is movable in the longitudinal direction of the vehicle for restraining or releasing an occupant, comprising:
   webbing driving means for moving one end of the webbing in the longitudinal direction of the vehicle to fasten the webbing to or unfasten the same from the occupant;
   seated condition detecting means for detecting that the occupant has seated to emit a signal;
   door condition detecting means for detecting that the door has been closed to emit a signal;
   vehicle speed detecting means for detecting that the vehicle speed has reached or exceeded a predetermined speed to emit a signal;
   fastened webbing detecting means for detecting that the webbing has moved to a webbing fastened position to emit a signal;
   unfastened webbing detecting means for detecting that the webbing has moved to a webbing unfastened position to emit a signal; and
   a control circuit for driving said webbing driving means for a predetermined period of time in response to the signals from said seated condition detecting means and said door condition detecting means, or said vehicle speed detecting means, and for stopping to drive said webbing driving means in response to the signal from said fastened webbing detecting means or said unfastened webbing detecting means.

3. A passive seatbelt system as set for claim 2, wherein said control circuit is adapted to drive warning means when the seated occupant signal from said seated condition detecting means and the closed door signal from said door condition detecting means are fed and no signal is fed from said fastened webbing detecting means, and when the signal informing that the vehicle speed has exceeded a predetermined speed is fed from said vehicle speed detecting means.

4. A passive seatbelt system as set forth in claim 2, wherein said control circuit is adapted to drive said webbing driving means to release the webbing when the signal for releasing the fastened webbing is fed from said unfastened webbing detecting means and the signal informing that the vehicle speed has reached or exceeded a predetermined speed is not fed from said vehicle speed detecting means.

5. A passive seatbelt system as set forth in claim 2, 3 or 4 wherein said fastened webbing detecting means is a limit switch provided at a position adjacent the rear end of a guide rail, to which position reaches a slide plate slidable along said guide rail in the longitudinal direction in the vehicle, and said unfastened webbing detecting means is a limit switch provided at a position adjacent the forward end of said guide rail, to which position reaches said slide plate.

* * * * *